O. A. KALBFUS.
STREET CAR BRAKE AND FENDER.
APPLICATION FILED DEC. 22, 1915.

1,189,964.

Patented July 4, 1916.

Witnesses
Edwin L. Bradford
Bertha K. Walter

Inventor
Oliver A. Kalbfus
By
Mann & Co.
Attorneys

UNITED STATES PATENT OFFICE.

OLIVER A. KALBFUS, OF BALTIMORE, MARYLAND.

STREET-CAR BRAKE AND FENDER.

1,189,964.　　　　Specification of Letters Patent.　　Patented July 4, 1916.

Application filed December 22, 1915. Serial No. 68,110.

*To all whom it may concern:*

Be it known that I, OLIVER A. KALBFUS, a citizen of the United States, residing at Baltimore, in the State of Maryland, have invented certain new and useful Improvements in Street-Car Brakes and Fenders, of which the following is a specification.

This invention relates to a combined street-car-brake and fender, to be used under conditions of emergency where a quick stop is required.

This brake for street-cars is intended to supplement and work on the same car with any ordinary well-known brake with which street-cars are now equipped.

This brake is not intended to do the ordinary service braking, such as partly applying brake-pressure when the car is descending a hill, or lightly applying the brake to make a slow stop when the car is approaching a regular stopping place. For such service brake action, the ordinary air-brake or hand-brake now on cars will continue to be used.

The invention will first be described in connection with the accompanying drawing and then pointed out in the claims.

Figure 1:
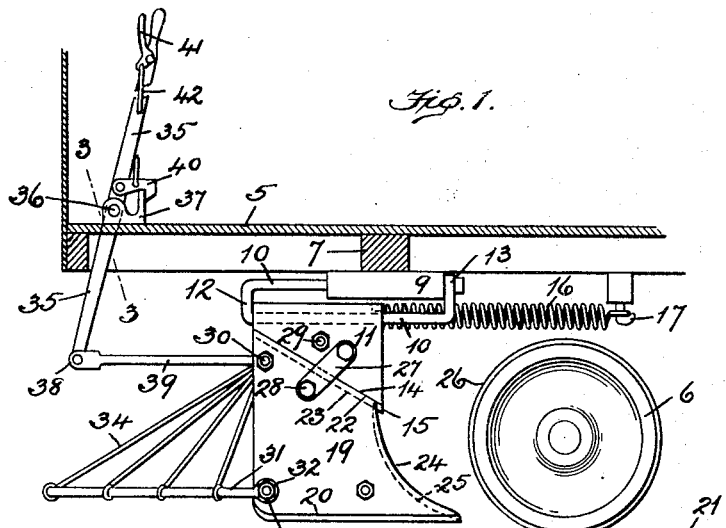
Figure 2:
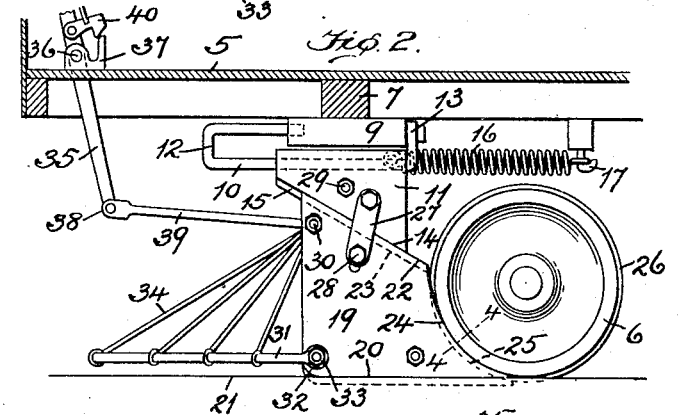
Figure 4:
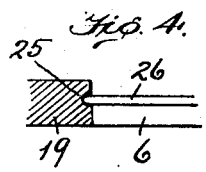
Figure 3:
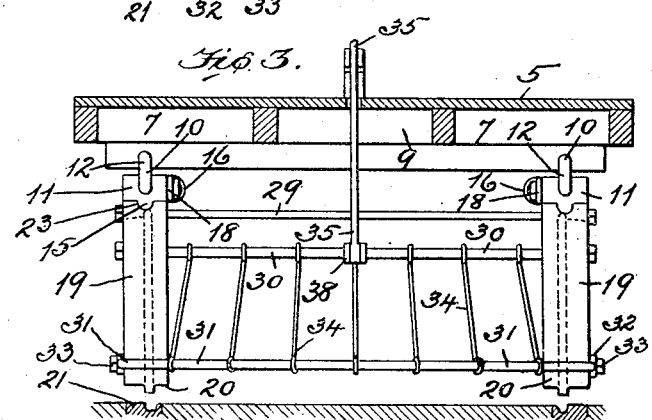

In the annexed drawing, Figure 1, is a sectional elevation of one end of a car body, and a side view of a wheel, car-brake and fender. In this view the brake parts have the "off", or not applied position. Fig. 2, is a similar view in which the brake parts are shown in the applied position, and the fender is lowered. Fig. 3, is a front elevation of the brake-parts and fender parts shown in Fig. 1, and a vertical cross-section of the car-body on the line 3—3 in Fig. 1. Fig. 4, is a section view on the line 4—4 of Fig. 2, showing the brake-shoe applied to the wheel.

Referring to the drawing the only part of a street-car that is necessary to show for an understanding of this invention, is the car-floor 5, and a wheel 6. A cross-beam 7, in the frame of the car-floor sustains the brake parts and fender. A hanger beam 9, is secured below the car floor, and the brake parts and fender of this invention are sustained by said hanger beam. Two loop bars 10, have fixed position and are secured to said hanger-beam 9, one of said loops being at each end of the beam and extending longitudinally of the car, as seen in Figs. 1 and 2. The lower horizontal bar of the loop serves as a slideway on which a brake-head 11, slides. Each loop bar has two vertical stops, one which is designated 12, is at the front end, and the other 13, is at the rear end, and these stops limit the sliding movement of said brake-head 11. When this emergency brake is "off", or in the normal position for running the car, the brake-head 11 will be contacting with the front stop 12, as in Fig. 1, and when the emergency brake is "on", the brake-head will contact with rear stop 13, as in Fig. 2.

It is to be understood that one of the two loop bars 10, is at each of the two sides of the car. A cross rod 29, connects the two slidable brake-heads 11, that are at opposite sides of the car. Each brake-head 11, is horizontal on top, and its sliding movement takes place immediately below the said hanger-beam 9, and the bottom of each brake-head is inclined downward from the front to the rear, as at 14, and said inclined bottom is provided with a tongue 15.

A spiral spring 16, is located at each side of the car and below the frame of the car-floor; the rear end of the spring is secured by a hook 17, or other means, to a stationary object, to wit: the car frame, and the front end of the spring is secured at 18, to a movable object, to wit, the slidable brake-head 11, and the effect of the spring is to pull backward on said brake-head.

The brake-shoe 19, has a horizontal bottom 20, that is adapted when the shoe is lowered to contact with the track-rail 21, and produce the emergency application of the brake; the top of the brake-shoe is inclined as at 22, relative to the horizontal bottom, and this top incline corresponds to and contacts with the bottom incline 14, on the brake-head. The brake-shoe top also has a groove 23, which receives the tongue 15, on the brake-head. The shoe has a concavo curved face 24, that corresponds with the rounded curved rim of the wheel, and the curved face of the shoe is provided with a groove 25. At the time of making an emergency application of the brake said curved face 24, will contact with the wheel-rim, and the groove 25, in the face will receive the wheel flange 26, as seen in Fig. 4. A swinging link 27, loosely connects the brake-shoe 19, with the brake-head 11; the upper end of this link is secured by a bolt that acts only as a pivot, but the lower end carries a bolt 28, that is loose in a hole in the brake-shoe 19, which hole is slightly elongated in the vertical direction. The looseness of connection due to the particular construction permits the brake-shoe to swing relatively to the brake-head, and also to lower; this movement of the brake-shoe is the action that the brake-shoe takes when it is transferred from the "off" position shown in Fig. 1, to the applied position seen in Fig. 2.

The fender at the front end of the car is attached to the two brake-shoes 19, rigidly and therefore the fender has the same movements as the shoes. The means for attaching the fender to the brake-shoes consists of a cross-rod 30, which also constitutes the upper rod of the fender frame. The lower rod of the fender frame is bent to the form, approximately, of a letter V; each of the two ends 31, of the said lower rod lap over on the outer side of one of the brake-shoes where the end terminates in an eye 32, and is secured by a bolt in the eye and a nut 33. A series of short rods 34, extends in an inclined direction from the upper fender rod 30, to the lower rod 31. A lever 35, whose handle is above the car-floor 5, is employed for operating the brake-shoes 19, and the fender 34. This lever has its pivot 36, in a base-plate 37, fixed on the car-floor 5, and the lower end of the lever has a joint connection 38, with one end of a rod 39, whose other end is attached to the upper cross-rod 30, of the fender. A hook-pawl 40, is pivoted to the lever 35, and the hook part by a gravity movement engages the base-plate 37, and thereby holds the lever when the fender 24, is elevated, and the brake parts are in the "off" or released position, as in Fig. 1. The lever-handle is provided with a bell-crank lever 41, and a rod 42, connects the bell-crank lever with the pawl 40.

To operate and apply the emergency brake and fender, the bell-crank lever 41, must release the pawl 40 from the base-plate and thereupon the brake-shoe 19, will lower to the position shown in Fig. 2, which is the applied position; to facilitate this action the springs 16, will immediately draw the brake-heads 11, back until they contact with the rear stops 13. In this operation the fender is lowered, and by the action of the springs is also drawn back.

Having described my invention what I claim is,—

1. The combination with a car of a loop bar at each side of the car and extending longitudinally thereof; a brake head slidable on each of said loop-bars; a spring attached to each brake-head to draw it backward; a brake-shoe suspended by a swinging link from each slidable brake-head, said brake-shoe adapted to lower and contact with the track-rail, and means for releasing the said contact of the brake-shoe.

2. The combination with a car of a hanger-beam secured below the car-frame; a loop bar at each side of the car and secured to the end of said hanger-beam; a brake-head slidable on each of said loop-bars; a spring attached to each brake-head to draw it backward; a brake-shoe suspended by a swinging link from each slidable brake-head, said brake-shoe adapted to lower and contact with the track-rail and also swing back and contact with a car-wheel; and means for releasing the said contact of the brake-shoe.

3. The combination with a car of a loop bar at each side of the car; a brake-head slidable on each of said loop-bars said brake-head having an inclined bottom; a spring that normally presses the brake-head to the backward position but yields to allow it to slide forward; a brake-shoe having a top that is inclined to correspond with the inclined bottom of said brake-head and the two inclines contacting, said incline of the brake-shoe being slidable on the incline of the brake-head; a swinging link loosely connecting the brake-shoe with the said brake-head; and means for effecting the operation of the brake to apply or release.

4. The combination with a car of a loop-bar at each side of the car; a brake-head slidable on each of said loop-bars said brake-head having an inclined bottom; a spring that normally presses the brake-head to the backward position; a brake-shoe having a top that is inclined to correspond with the inclined bottom of the brake-head and the two inclines contacting; a swinging link loosely connecting the brake-shoe with the said brake-head; a fender at the front end of the car and attached to the said two brake-shoes and movable therewith; and means operated manually that will effect a movement of both the fender and brake-shoes.

In testimony whereof I affix my signature in the presence of two witnesses.

OLIVER A. KALBFUS.

Witnesses:
CHAS. B. MANN,
BERTHA K. WALTER.

Copies of this patent may be obtained for five cents each, by addressing the "Commissioner of Patents Washington, D. C."